United States Patent Office 3,499,893
Patented Mar. 10, 1970

3,499,893
PYRIMIDINYL- OR DIAZEPINYLTHIOACET-AMIDOCEPHALOSPORANIC ACIDS
Leonard Bruce Crast, Jr., Clay, N.Y., assignor to Bristol-Myers Company, New York, N.Y., a corporation of Delaware
No Drawing. Filed Dec. 6, 1968, Ser. No. 781,994
Int. Cl. C07d 99/24
U.S. Cl. 260—243          9 Claims

ABSTRACT OF THE DISCLOSURE

This invention relates to certain 7-[α-(3,4,5,6 - tetrahydro - 2 - pyrimidinylthio)- and 7-[α(1H - 4,5,6,7-tetrahydro - 1,3 - diazepinyl - 2 - thio) - acetamido]cephalosporanic acids and to processes for the preparation thereof. A typical example would be the reaction of 7-(α-bromoacetamido)-cephalosporanic acid with 2-mercapto-3,4,5,6 - tetrahydropyrimidine to produce 7-[α-(3,4,5,6-tetrahydro - 2 - pyrimidinylthio) - acetamido]-cephalosporanic acid. The compounds of the invention are antibacterial agents.

BACKGROUND OF THE INVENTION

Field of the invention

This invention relates to chemical compounds useful as antibacterial agents in the treatment of infectious diseases caused by gram-positive and gram-negative bacteria in mammals, and particularly in man.

Description of the prior art

There exists a need to provide alternative and improved agents for the treatment of infections caused by resistant strains of bacteria, e.g., benzylpenicillin resistant strains of *Staphylococcus aureus*, or for the decontamination of objects bearing such organisms, e.g., hospital equipment, etc.

SUMMARY OF THE INVENTION

The 7 - [tetrahydro - 2 - diazepinylthio]- and 7-[tetrahydro - 2 - pyrimidinylthio] - acetamido - cephalosporanic acids of the present invention are compounds having the formula

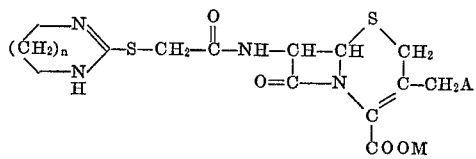

wherein:

A is hydrogen, hydroxyl, (lower) alkanoyloxy, benzoyloxy, a quaternary ammonium radical or, when taken together with M, a monovalent carbon-oxygen bond;
$n$ is an integer of 1 or 2; and
M is hydrogen, a pharmaceutically acceptable nontoxic cation, an ionic charge when A is the quaternary ammonium radical, or when taken together with A, a monovalent carbon-oxygen bond.

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive and Gram-negative bacteria, and more particularly, relates to certain 7-[α-(3,4,5,6-tetrahydro - 2 - pyrimidinylthio) and 7-[α-(1H-4,5,6,7-tetrahydro - 1,3 - diazepinyl - 2 - thio)-acetamido]-cephalosporanic acids, related salts and derivatives thereof, and to the process for the preparation of same.

Antibacterial agents in the past have proven highly effective in the therapy of infections due to either Gram-positive or Gram-negative bacteria but few are effective against both. It was the objective of the present invention to provide novel compounds effective against both Gram-positive and Gram-negative bacteria including resistant strains.

It was a further object of the present invention to provide cephalosporins active against Gram-positive and Gram-negative bacteria which are also efficiently absorbed upon parenteral or oral administration to man and animals.

The objects of the present invention have been achieved by the provision, according to the present invention, of the compounds of the formula

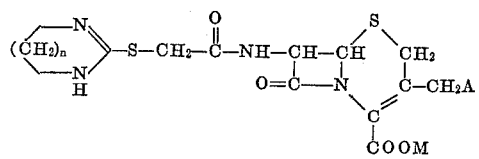

I wherein:

$n$ is an integer of 1 or 2;
A is hydrogen, hydroxyl, (lower)alkanoyloxy containing 2 to 8 carbon atoms, e.g., acetoxy, propionoyloxy, butanoyloxy, pentanoyloxy, etc. benzoyloxy, a quaternary ammonium radical, e.g. pyridinium, quinolinium, picolinium, lutidinium, or, when taken together with M, a monovalent carbon-oxygen bond; and
M is hydrogen, a pharmaceutically acceptable nontoxic cation, an anionic charge when A is the quaternary ammonium radical, or when taken together with A, a monovalent carbon-oxygen bond.

The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g. "(lower)-alkoxy," it refers to the alkyl portion of such group which is therefore as described above in connection with "(lower)alkyl" and thus includes such radicals as methoxy, ethoxy, isopropoxy, etc.

For illustrative purposes, shown below is the formula of the compound when in Formula I $n$ is 1, A is acetoxy and M is H.

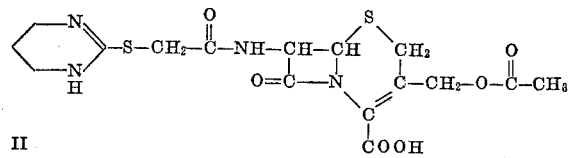

II

Also for illustrative purposes, shown below are the formulas of the compound when, in Formula I, $n$ is 1, A is a quaternary ammonium radical (pyridinium) and M is an anionic charge (III) and when A and M together are a monovalent carbon-oxygen bond. (IV).

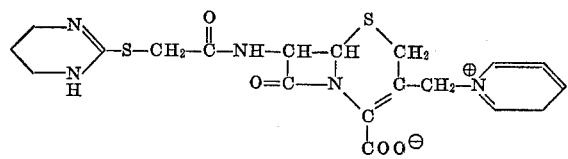

III

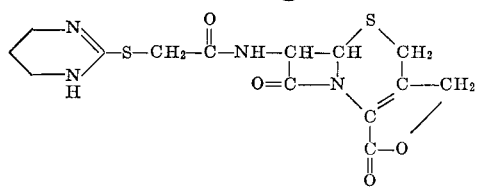

IV

Another example:

n is 1, A is hydrogen and M is hydrogen.

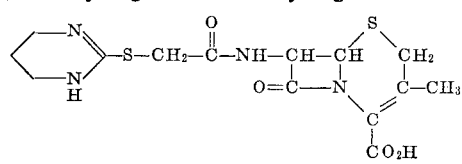

V

A preferred group of compounds within the present invention is the group having the formula

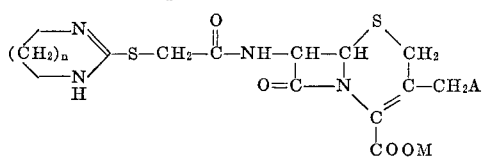

wherein:

n is an integer of 1 or 2;

A is hydrogen, hydroxyl, (lower)alkanoyloxy, benzoyloxy, a quaternary ammonium radical or, when taken together with M, a monovalent carbon-oxygen bond; and M is hydrogen, a pharmaceutically acceptable nontoxic cation, an anionic charge when A is a quaternary ammonium radical or, when taken together with A, a monovalent carbon-oxygen bond.

A more preferred group of compounds within the present invention is the group having the formula

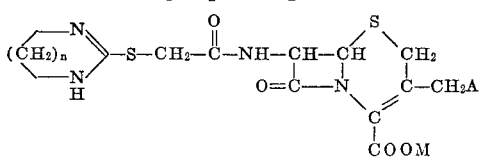

wherein:

n is an integer of 1 or 2,

A is hydrogen, acetoxy, benzoyloxy, a quaternary ammonium radical of the formula

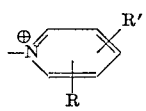

wherein R and R' are each hydrogen or methyl, or when taken together with M, a monovalent carbon-oxygen bond; and M is hydrogen or a pharmaceutically acceptable nontoxic cation.

A most preferred embodiment is the group of compounds having the formula

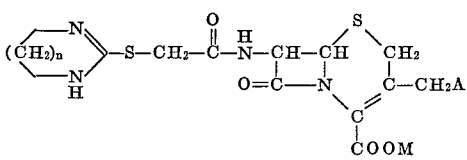

wherein:

n is 1 or 2,

A is hydrogen or acetoxy and M is hydrogen or a nontoxic pharmaceutically acceptable cation.

The pharmaceutically acceptable, nontoxic cations include metallic cations such as sodium, potassium, calcium and aluminum and organic amine cations such as trialkylamines, e.g. triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N - lower) - alkylpiperidines, e.g. N-ethylpiperidine, and other amines which have been used to form salts with benzylpenicillin.

As the compounds of the present invention are by definition capable of forming salts with acids due to their basic nitrogen functions, the compounds are in a sense amphoteric and include the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, succinate, benzoate, tartrate, fumarate, malate, mandelate, ascorbate and the like.

The compounds of the present invention are prepared by a new and novel two step process. Heretofore it has been common practice to acylate 7-aminocephalosporanic acid with an acyl halide or its functional equivalent. This method produces good yields and a high quality product under normal conditions but is not readily conducive to either good yield or high quality product when the acylating agent's side chain contains a basic nitrogen function such as a primary or secondary amine, capable of forming amides. In the preparation of the amine containing acylating agent, it is not as uncommon for the acyl halide or its functional equivalent to self-condense producing polymeric tars and decomposition product. The two step process of the present invention avoids this problem and produces products in yields that are commerically valuable.

The products of the present invention are prepared in a two-step process:

(1) A compound of the formula

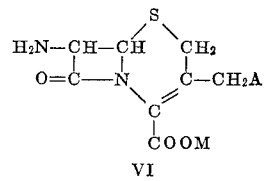

VI wherein A and M are described above (preferably in the form of a neutral salt such as the sodium salt or the triethylamine salt, i.e. when A is hydrogen, hydroxy, (lower)alkanoyloxy or benzoyloxy) is mixed with an acid halide having the formula

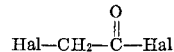

in which Hal is a halogen such as chloro, bromo or iodo or with its functional equivalent as an acylating agent for a primary amino group to produce a compound having the formula

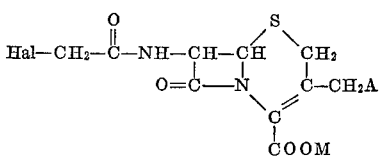

VII

The preferred acylating agent is a haloacetyl halide, most preferably bromoacetyl bromide.

Functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid.

In addition, an acid azide or an active ester or thioester (e.g. with p-nitro-phenol, 2,4-dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. South African Patent Specification 63/2684] of a carbodiimide reagent [especially N,N'-dicyclohexylcarbodiimide, N,N'-diisopropylcarbodiimide or N-cyclohexyl-N'-(2-morpholinoethyl)carbodiimide; [cf. Sheehan and Hess, J. Amer. Chem, Soc. 77, 1067 (1955)], or of alkynylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e. an amide or the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for carrying out these reactions to produce a cephalosporin so-produced are well-known in the art (cf. U.S. Patents Nos. 3,079,314; 3,117,126 and 3,129,224 and British Patents Nos. 932,644; 957,570 and 959,054).

(2) The second step of the process is performed by mixing together material having the Formula VII with a basic nitrogen-containing mercaptan having the formula

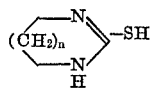

wherein $n$ is an integer of 1 or 2; to produce compounds of the Formula I

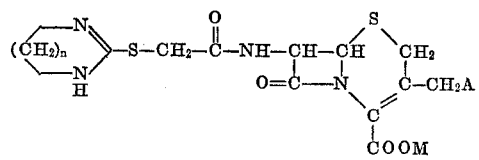

The compounds of the present invention have also been achieved by the provision according to the present invention of the process for the preparation of the compound having the formula

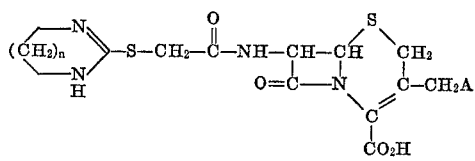

wherein:

$n$ is an integer of 1 or 2;

A is hydrogen or acetoxy (which is preferred), and the pharmaceutically acceptable, nontoxic salts thereof; which comprises mixing a compound having the formula

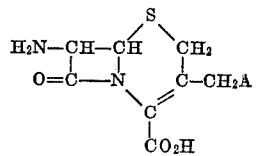

VIa wherein A is as described above, with an acid halide having the formula

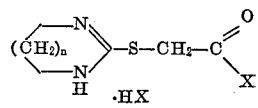

in which X is chloro, bromo or iodo, but preferably chloro, in a molar ratio of at least one mole of acid halide hydrohalide per mole of compound IIa, but preferably in a ratio of 1.0 to 1.4 moles of acid halide per mole of compound VIa; in an organic solvent selected from the group comprised of methylene chloride, dichloroethane, ethyl acetate, chloroform, or the like, but preferably methylene chloride; in the presence of an excess of tertiary amine such as pyridine, triethylamine, trimethylamine, or the like, but preferably triethylamine, and preferably in a ratio of at least 3 moles of tertiary amine per mole of acid halide hydrohalide; at a temperature in the range of about −25° C. to +35° C., but preferably about −5° C. to +5° C.

The starting materials used in the present invention include 7-aminocephalosporanic acid (7–ACA) and derivatives of 7-aminocephalosporanic acid, 7-aminocephalosporanic acid is prepared by hydrolysis of cephalosporin C and has the formula

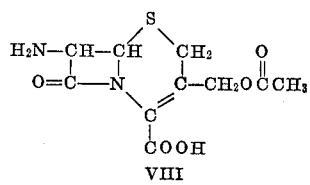

VIII

Acid hydrolysis of cephalosporin C to produce 7-aminocephalosporanic acid results in the co-production of the lactone, 3-hydroxymethyl-7-aminodecephalosporanic acid lactone, formed by the further hydrolysis of the acetoxy group and subsequent internal esterification. The lactone has the formula

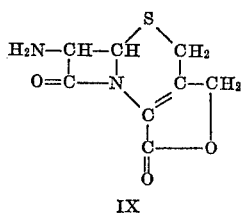

IX

Enzymatic hydrolysis of the acetoxy group of 7-aminocephalosporanic acid results in the formation of 3-hydroxymethyl-7-aminodecephalosporanic acid having the formula

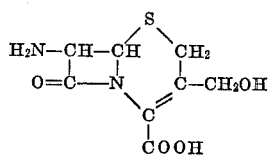

X and such compound may be re-esterified with benzoic acid or a lower alkanoic acid, e.g. acetic acid, propionic acid and the like to form other esters. Preferably, re-esterification is carried out on a 3-hydroxymethyl-7-(α-hydroxythienylacetamido)decephalosporanic acid which is obtained by enzymatic hydrolysis of a 7-(α-hydroxythienylacetamido)cephalosporanic acid.

Treatment of cephalosporin C with a tertiary amine, e.g. pyridine, lutidines, picolines and the like, followed by acid hydrolysis produces a neucleus which, in the case of pyridine, has the formula

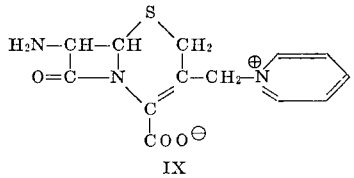

IX and has been given the name 3-pyridiniummethyl-7-aminodecephalosporanic acid inner salt.

The foregoing nuclei and the preparation thereof are known in the art and are described for example in U.S. Patent No. 3,117,126 and British Patents Nos. 932,644; 957,570 and 959,054.

3-methyl-7-aminodecephalosporanic acid having the formula

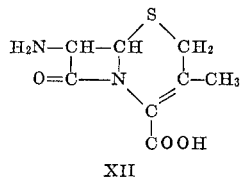

XII is produced by catalytic reduction of cephalosporin C followed by hydrolytic removal of the 5-aminoadipolyl side chain as described in U.S. Patent No. 3, 129,224.

The process for the preparation of the compounds of the instant invention is usually performed by dissolving a one molar quantity of a compound having the Formula XI, XII, VIII, IX or X, in a 2:1 water-acetone solution which is buffered with 3 moles of a bicarbonate.

The solution is rapidly stirred and cooled to 0° C. and one mole of a haloacetyl halide, preferably bromoacetyl bromide, is added rapidly. The temperature is maintained at 0°-5° C. for ten minutes and then stirred for an additional one hour as the temperature is allowed to approach 25° C. The mixture is concentrated in vacuo at 20° C. to about one-half volume and then doubled in volume by the addition of water. Two ether extractions are made and the ether extracts discarded. The aqueous solution is covered by a layer of ethyl acetate or its equivalent, stirred and cooled during which time the solution is acidified to pH 2 by the addition of 40% $H_3PO_4$.

The mixture is filtered and the ethyl acetate layer separated, washed with water, dried over sodium sulfate, filtered, and then treated with a solution of sodium or potassium 2-ethyl hexanoate (SEH-KEH) in n-butanol. The oil which forms is scratched to induce crystallization. The resultant crystals are collected, washed several times with acetone and dried in vacuo over $P_2O_5$ to yield a sodium or potassium 7-(α-bromoacetamido)-cephalosporanate or derivative of same corresponding to the starting material.

The bromoacetamidocephalosporanate derivative is dissolved in a quantity of water at room temperature and is rapidly stirred during the dropwise addition over a one hour period of a solution composed of equimolar quantities of a basic nitrogen substituted mercaptan and an alkali carbonate, i.e. sodium, potassium, etc. Stirring is continued an additional 90 minutes following which 40% phosphoric acid is added until pH 2.5–3.0 is reached. The product, which usually crystallizes, is collected, then washed with water and ethyl acetate to yield desired material of Formula I.

In the process for the preparation of the compounds of Formulae I and VII above, the compounds are sometimes in aqueous solution in the form of their sodium or potassium salt. These compounds in the aqueous phase can then be converted to the free acid, preferably in the cold under a layer of organic solvent by the addition of mineral acid, e.g. 40% $H_3PO_4$ to pH 2–3. The free acid can then be extracted into a water-immiscible, neutral organic solvent such as ethyl acetate, the extract washed with water quickly in the cold, if desired, and dried, as with anhydrous $Na_2SO_4$ and the free acid recovered from the organic solvent solution. The product in the ethyl acetate extract in its free acid form can then be converted to any desired metal or amine salt, particularly the pharmaceutically acceptable nontoxic amine salts described above, by treatment with the appropriate base, e.g. a free amine such as procaine base or a solution of potassium 2-ethylhexanoate in dry n-butanol. These salts are usually insoluble in solvents such as ethyl acetate and can be recovered in pure form by simple filtration.

The objectives of the present invention have been achieved, by the provision according to the present invention, of the process for the synthesis of 7-[α-(substituted-thio)-acetamido]-cephalosporanic acids which comprises the consecutive steps of:

(a) Mixing together a compound having the formula

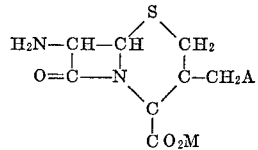

wherein:

A is hydrogen, hydroxyl, (lower)alkanoyloxy, benzoyloxy, a quaternary ammonium radical, or when taken together with M, a monovalent carbon-oxygen bond; and M is hydrogen, a pharmaceutically acceptable nontoxic cation, an anionic charge when A is a quaternary ammonium radical or, when taken together with A, a monovalent carbon-oxygen bond, with about 1 to 1.5 molar equivalent, but preferably about 1 molar equivalent, of an α-haloacetylhalide having the formula

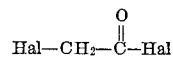

wherein Hal is a halogen selected from the group consisting of chloro, bromo and iodo, but is preferably bromo, or its functional equivalent as an acylating agent for a primary amino group in the presence of about 1 to 4.0 molar equivalents, but preferably 2 to 3 molar equivalents of a base selected from the group consisting of alkali metal carbonates and bicarbonates, i.e., $NaHCO_3$, $Na_2CO_3$, $KHCO_3$, $K_2CO_3$, etc., or pyridine in a water-water-miscible ketonic solvent system such as water in combination with acetone, methyl isobutylketone (MIBK), butanone, etc., but preferably with acetone, at a temperature of about —20° C. to about 50° C., but preferably in the range of 0° C. to 25° C., to produce a compound having the formula

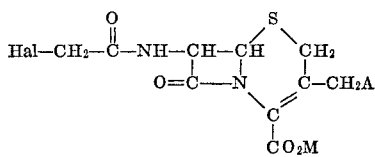

wherein A and M are as described above, and (b) Mixing said α-haloacetamido compound with about 1 to 1.5 molar equivalents, but preferably about 1 molar equivalent, of a mercaptan having the formula

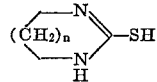

wherein n is an integer of 1 or 2, in the presence of about 1 to 1.5 molar equivalents, but preferably about 1 molar equivalent, of a base selected from the group consisting of an alkali metal hydroxide, bicarbonate and carbonate, i.e., NaOH, KOH, Na$_2$CO$_3$, K$_2$CO$_3$, KHCO$_3$, NaHCO$_3$, etc., in an aqueous solvent system at a temperature of about −20° C. to 50° C. but preferably in the range of about 10° C. to about 35° C. to produce a compound having the formula

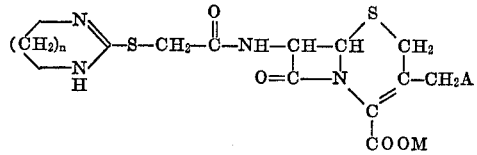

wherein A, n and M are as described above.

In the treatment of bacterial infections in man, the compounds of this invention are administered orally or parenterally, but preferably parenterally, in accordance with conventional procedures for antibiotic administration, in an amount of from about 5 to 60 mg./kg./day and preferably about 20 mg./kg./day in divided dosage, e.g., three to four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The compound below, 7-[α-(2-pyrimidinylthio)-acetamido]-cephalosporanic acid,

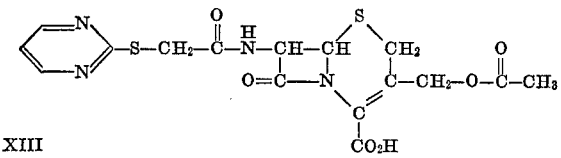

XIII had been previously prepared in our laboratories and is disclosed in U.S. Ser. No. 635,361. The compound was only moderately active in vitro screening against various organisms.

In view of the above, it was surprising to discover that 7-[α-(3,4,5,6-tetrahydro-2-pyrimidylthio)-acetamido]-cephalosporanic acid (II) and 7-[α-(1H-4,5,6,7-tetrahydro-1,3-diazepinyl-2-thio)-acetamido]-cephalosporanic acid (XV) were substantially more active against a variety of the same organisms than was compound XIII.

Comparative MIC's for compounds XIII, II and XV.

MIC (μg./ml.)

|  | XIII | II | XV |
|---|---|---|---|
| D. pneumoniae | 0.5 | 0.008 | 0.04 |
| St. pyogenes | 0.25 | 0.016 | 0.08 |
| S. aureus Smith | 0.5 | 0.6 | 0.6 |
| Sal. enteritidis | 6.2 | 1.3 | 0.6 |
| E. coli Juhl | >100 | 2.5 | 1.3 |
| K. pneumoniae | 50 | 1.3 | 0.6 |

The following examples will serve to illustrate this invention without limiting it thereto. All temperatures are given in degrees centigrade.

In the examples below, ACA represents the compound having the formula

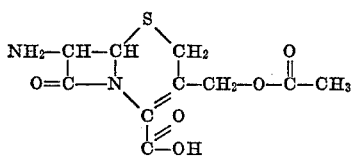

Likewise in the examples that follow, "MIC" represents the minimum inhibitory concentration in mcg./ml. of the compound required to inhibit the growth of the test organism described.

DESCRIPTION OF THE PREFERRED EMBODIMENTS

Example 1.—Sodium 7-(α-bromacetamido)-cephalosporanate

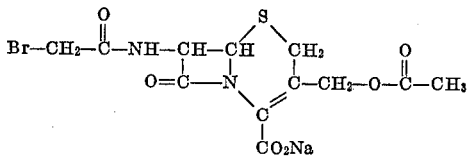

27.2 grams (0.1 mole) of 7-ACA, 33.2 grams (0.3 mole) of NaHCO$_3$, 200 ml. of water and 100 ml. of acetone were mixed together, cooled to 0° C. and stirred rapidly while 20.1 grams (0.1 mole) of bromoacetyl bromide dissolved in 100 ml. of acetone was added in one fast addition. The temperature was kept at 0°–5° C. for ten minutes, then the ice-salt bath was removed and stirring continued for one hour as the temperature approached 25° C. The mixture was concentrated in vacuo at 20° C. to one-half volume and 200 ml. of water added. Two 400 ml. ether extracts were made and discarded. The aqueous solution was covered with 200 ml. of ethyl acetate and vigorously stirred and cooled while being acidified to pH 2 with 40% phosphoric acid. The mixture was filtered, the ethyl acetate layer separated and washed with three 100 ml. portions of water, dried over Na$_2$SO$_4$, filtered and treated with 30 ml. of sodium 2-ethylhexanoate in n-butanol (34 ml.=0.1 mole). The oil which settled out was scratched to induce crystallization After stirring for twenty minutes the product was scraped from the sides of the flask and collected. The filter cake was washed with several portions of acetone, air dried, and dried in vacuo over P$_2$O$_5$. The yield was 22.5 grams and decomposed at 193° C. The infrared (IR) and nuclear magnetic resonance (NMR) spectra were consistent with the above named compound, sodium 7-(α-bromoacetamido)-cephalosporanate. (See U.S. Patent 3,173,916.) The free acid was obtained by acidification of an aqueous solution of the salt to pH 2.

*Analysis.*—Calc'd for C$_{12}$H$_{12}$BrN$_2$O$_6$S·Na (percent): C, 34.70; H, 2.92. Found (percent): C, 32.43; H, 2.86; H$_2$O, 0.93.

Example 2.—7-[α-(3,4,5,6-tetrahydro-2-pyrimidinyl)-acetamido]-cephalosporanic acid

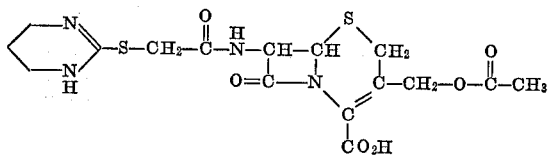

7-(α-bromoacetamido)-cephalosporanic acid (7.9 grams, 0.02 mole) was dissolved in 250 ml. of dioxane. To this solution was added 2.32 grams (0.02 mole) of 2-mercapto-3,4,5,6-tetrahydropyrimidine with rapid stirring at about 22° C. Twenty minutes after completion of the addition of the mercaptan, the solids which formed were collected by filtration, redissolved in 200 ml. of water, the solution was filtered and then extracted with a solution of 4.4 grams (0.01 mole) of aerosol OT (a long chain alkylaminosulfonic acid) in 150 ml. of methyl isobutyl ketone (MIBK). The MIBK extract was washed with water, dried fifteen minutes over anhydrous sodium sulfate, filtered and the pH adjusted to six with triethylamine. The precipitate was filtered off, washed with MIBK and then acetone. The air dried material was further dried over P$_2$O$_5$ under vacuum for twelve hours. The yield was 1.98 grams; decomposition >100° C. (slowly). The infrared and nuclear magnetic resonance spectra were consistent with the structure above.

*Analysis.*—Calc'd for C$_{16}$H$_{20}$N$_4$O$_6$S$_2$ (percent): C, 44.86; H, 4.72. Found (percent): C, 44.62; H, 5.60.

Example 3.—Preparation of 1,3-diazacycloheptane-2-thione

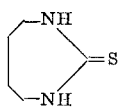

1,4-diaminobutane (88.15 g., 1 mole) was dissolved in 200 ml. of 95% ethanol and the solution was cooled to below 20° C. The temperature was maintained below 20° C. while 76.13 g. of carbon disulfide was added over a period of thirty minutes. The precipitate was removed by filtration and washed with 100 ml. of 95% ethanol to yield 157.5 grams of solid, M.P. 145–148° C.

The solid product was refluxed in 500 ml. of water for fourteen hours. An oil separated from the mixture during the reflux period. The aqueous phase was removed by decantation. Upon cooling, the aqueous phase deposited crystals. The crystals were collected and recrystallized from 950 ml. of boiling water to yield about 60 grams of 1,3-diazacycloheptane-2-thione, M.P. 177–180° C. Ref.: Canadian Journal of Chemistry, 35, 1438–1445 (1957).

Example 4.—7-[α-(1H-4,5,6,7-tetrahydro-1,3-diazepinyl-2-thio)-acetamido]-cephalosporanic acid

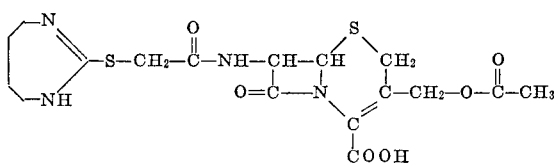

Sodium 7-(α-bromoacetamido)-cephalosporanate (4.15 g., 0.01 mole), sodium bicarbonate (0.84 gram, 0.01 mole) and 1,3-diazacycloheptane-2-thione were dissolved in 50 ml. of water and stirred at about 5° C. for two hours. The solution was filtered to remove a small amount of undissolved thione, following which the solution was layered with 50 ml. of ethyl acetate, cooled and stirred while the pH was adjusted to pH 2 with 40% phosphoric acid. The ethyl acetate extract was discarded and the acidified aqueous phase extracted with a second portion of ethyl acetate which was also discarded.

The acidified aqueous solution was extracted with a solution of 2.4 grams of aerosol OT in 100 ml. of MIBK. The MIBK-aerosol extract was washed with water, dried over sodium sulfate, filtered and the pH adjusted to pH 6 with triethylamine. An oil separated that was triturated with fresh MIBK to produce crystals which were collected by filtration and dried. The crystals weighed 1.0 gram and decomposed slowly at 130° C. (slowly). The infrared spectrum and nuclear magnetic resonance spectrum were consistent with the structure.

Analysis.—Calc'd. for $C_{17}H_{22}N_4O_6S_2 \cdot H_2O$ percent: C, 44.23; H, 5.25. Found (percent): C, 44,41; H, 5.98.

Example 5.—Sodium 7-(α-bromoacetamido)-3-methyl-3-cephem-4-carboxylate

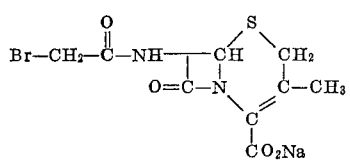

Substitution in the procedure of Example 1 for the 7-ACA used therein of 7-amino-3-methyl-3-cephem-4-carboxylic acid produced sodium 7-(α-bromoacetamido)-3-methyl-3-cephem-4-carboxylate, M.P. 217° C. with decomposition, yield 22.4 grams.

Example 6.—3-methyl-7-[α-(3,4,5,6-tetrahydro-2-pyrimidinylthio)-acetamido]-3-cephem-4-carboxylic acid

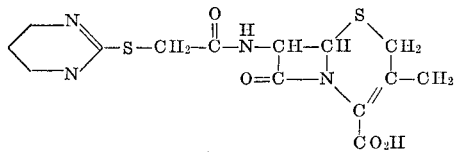

Substitution in the procedure of Example 2 for the 7-(α-bromoacetamido)-cephalosporanic acid used therein of 7-(α-bromoacetamido)-3-methyl - 3-cephem-4-carboxylic acid produces 3-methyl-7-[α-(3,4,5,6-tetrahydro-2-pyrimidinylthio)-acetamido]-cephalosporanic acid.

Example 7.—3-methyl-7-[α-(1H-4,5,6,7-tetrahydro-1,3-diazepinyl-2-thio)-acetamido]-3-cephem-4-carboxylic acid.

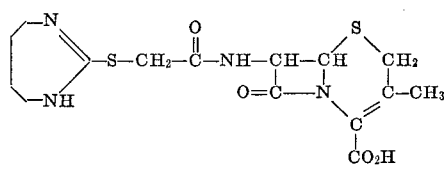

Substitution in the procedure of Example 4 for the sodium 7 - (α-bromoacetamido)-cephalosporanate used therein of sodium-7-(α-bromoacetamido) - 3 - methyl-3-cephem-4-carboxylate produces 3 - methyl-7-[α(3,4,5,6-tetrahydro-1,3-diazepinyl-2 - thio)-acetamido]-3-cephem-4-carboxylic acid.

I claim:
1. A compound having the formula

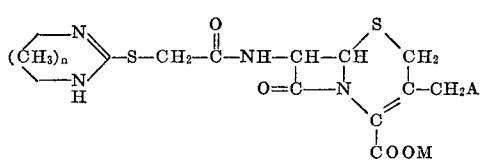

wherein:
n is an integer of 1 or 2,
A is hydrogen, acetoxy, benzoyloxy, a quaternary ammonium radical of the formula

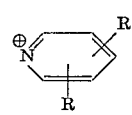

wherein R and R' are each hydrogen or methyl, or when taken together with M, a monovalent carbon-oxygen bond; and M is hydrogen or a pharmaceutically acceptable non-toxic cation.

2. A compound of claim 1 having the formula

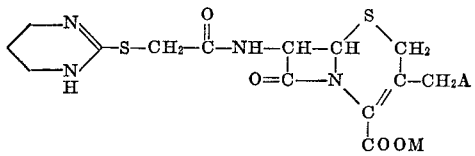

wherein:
A is hydrogen, acetoxy, benzoyloxy, a quaternary ammonium radical of the formula

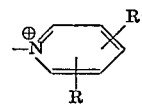

wherein R and R' are each hydrogen or methyl, or when taken together with M, a monovalent carbon-oxygen bond; and M is hydrogen or a pharmaceutically acceptable, non-toxic cation.

3. A compound having the formula

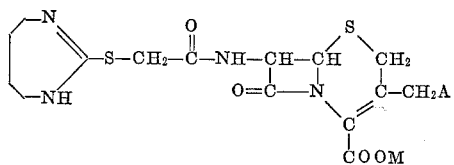

wherein:
A is hydrogen, acetoxy, benzoyloxy, a quarternary ammonium radical of the formula

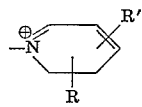

wherein R and R' are each hydrogen or methyl, or when taken together with M, a monovalent carbon-oxygen bond; and
M is hydrogen or a pharmaceutically acceptable nontoxic cation.

4. A compound of claim 1 wherein
A is acetoxy or hydrogen,
M is hydrogen or a nontoxic, pharmaceutically acceptable cation and
$n$ is an integer of 1 or 2.

5. A compound of claim 1 wherein
A is acetoxy,
$n$ is an integer of 1 or 2, and
M is hydrogen or a nontoxic, pharmaceutically acceptable cation.

6. The compound having the formula

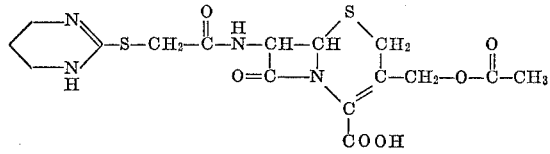

and a nontoxic, pharmaceutically acceptable salt thereof.

7. The compound having the formula

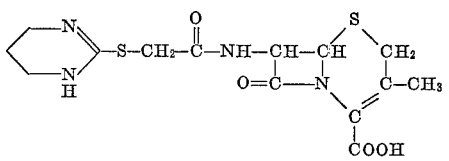

and a nontoxic, pharmaceutically acceptable salt thereof.

8. The compound having the formula

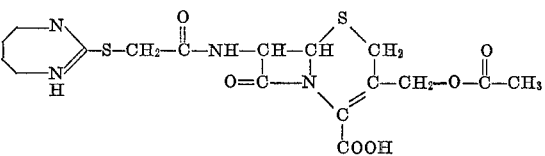

and a nontoxic, pharmaceutically acceptable salt thereof.

9. The compound having the formula

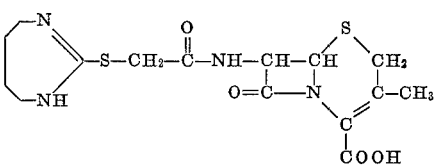

and a nontoxic, pharmaceutically acceptable salt thereof.

References Cited

UNITED STATES PATENTS 3,373,155  3/1968  Eksrom et al. _____ 260—239.1
3,382,238  5/1968  Dolfini _____ 260—239.1

NICHOLAS S. RIZZO, Primary Examiner

U.S. Cl. X.R.

424—246

PO-1050
(5/69)

UNITED STATES PATENT OFFICE
CERTIFICATE OF CORRECTION

Patent No. 3,499,893                    Dated March 10, 1970

Inventor(s) Leonard Bruce Crast, Jr.

It is certified that error appears in the above-identified patent and that said Letters Patent are hereby corrected as shown below:

In the claims, the first formula of claim 1 should read as follows:

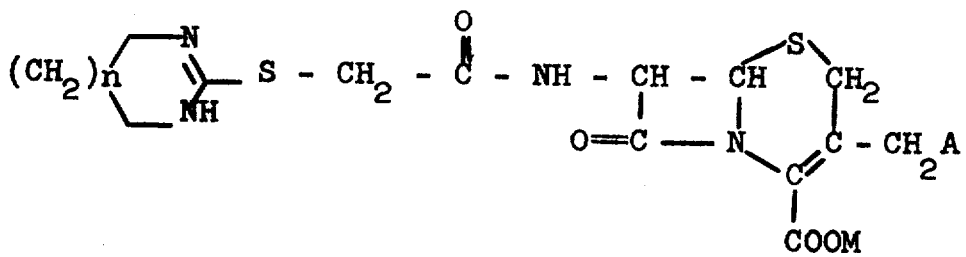

(column 12, lines 35-40)

the second formula of claim 1 should read as follows:

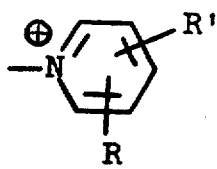

(column 12, lines 45-49)

the second formula of claim 3 should read as follows:

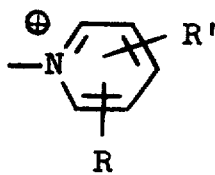

(column 13, lines 13-17)

UNITED STATES PATENT OFFICE
CERTIFICATE OF CORRECTION

Patent No. 3,499,893      Dated March 10, 1970

Inventor(s) Leonard Bruce Crast, Jr.    PAGE - 2

It is certified that error appears in the above-identified patent and that said Letters Patent are hereby corrected as shown below:

-2- the first formula of claim 8 should read as follows:

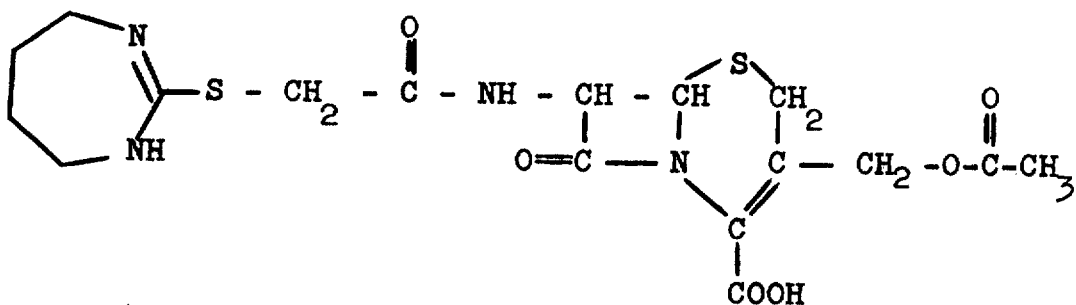

(column 14, lines 12-18)

SIGNED AND SEALED
AUG 18 1970

(SEAL)
Attest:

Edward M. Fletcher, Jr.
Attesting Officer

WILLIAM E. SCHUYLER, JR.
Commissioner of Patents